(12) United States Patent
Wang et al.

(10) Patent No.: US 11,647,538 B2
(45) Date of Patent: May 9, 2023

(54) DATA TRANSMISSION METHOD AND DEVICE, AND SIGNAL FEEDBACK METHOD AND DEVICE

(71) Applicant: DATANG MOBILE COMMUNICATIONS EQUIPMENT CO., LTD., Beijing (CN)

(72) Inventors: Jiaqing Wang, Beijing (CN); Fang-Chen Cheng, Beijing (CN)

(73) Assignee: DATANG MOBILE COMMUNICATIONS EQUIPMENT CO., LTD., Beijing (CN)

( * ) Notice: Subject to any disclaimer, the term of this patent is extended or adjusted under 35 U.S.C. 154(b) by 240 days.

(21) Appl. No.: 17/054,520

(22) PCT Filed: May 7, 2019

(86) PCT No.: PCT/CN2019/085888
§ 371 (c)(1),
(2) Date: Nov. 11, 2020

(87) PCT Pub. No.: WO2019/214626
PCT Pub. Date: Nov. 14, 2019

(65) Prior Publication Data
US 2021/0120583 A1    Apr. 22, 2021

(30) Foreign Application Priority Data
May 11, 2018   (CN) .......................... 201810450590.6

(51) Int. Cl.
*H04W 74/08*   (2009.01)
*H04B 7/06*   (2006.01)
(Continued)

(52) U.S. Cl.
CPC .......... *H04W 74/08* (2013.01); *H04B 7/0626* (2013.01); *H04W 72/046* (2013.01)

(58) Field of Classification Search
CPC ... H04W 74/08; H04W 72/046; H04W 16/14; H04W 16/28; H04W 88/08;
(Continued)

(56) References Cited

U.S. PATENT DOCUMENTS 11,197,320 B2 * 12/2021 Wang .................... H04W 72/14
2018/0098335 A1 * 4/2018 Sun ....................... H04B 7/0491
(Continued)

FOREIGN PATENT DOCUMENTS

| CN | 105230102 A | 1/2016 |
| CN | 105934988 A | 9/2016 |

(Continued)

OTHER PUBLICATIONS

"Listen Before Receive for Coexistence in Unlicensed mmWave Bands, Sandra Lagen and Lorenza Giupponi", Presented at IEEE Wireless Communications and Networking Conference Apr. 15-18, 2018. (Year: 2018).*

(Continued)

*Primary Examiner* — Habte Mered
(74) *Attorney, Agent, or Firm* — Kilpatrick Townsend & Stockton, LLP

(57) ABSTRACT

Disclosed are a data transmission method and device. The data transmission method comprises: after executing an LBT operation in a direction corresponding to at least one beam, a base station sending to a terminal a channel occupation request signal to request channel occupation; and after receiving a signal indicating that a channel is allowed to be occupied, the base station transmitting data on the beam sending the channel occupation request signal. The signal feedback method comprises: the terminal receiving the channel occupation request signal sent to the terminal by the base station on the at least one beam, and the channel occupation request signal is a signal for requesting channel (Continued)

After performing an LBT operation in a direction corresponding to at least one beam, a base station sends a channel occupation request signal to a terminal to request channel occupation ⟶ 701

After receiving a signal indicating that a channel is allowed to be occupied, the base station transmits data on a beam sending the channel occupation request signal ⟶ 702 occupation; and after correctly receiving the channel occupation request signal, the terminal feeding back, on the beam on which the signal is received, to the base station the signal indicating that the channel is allowed to be occupied.

20 Claims, 4 Drawing Sheets

(51) Int. Cl.
  *H04W 72/04* (2009.01)
  *H04W 72/044* (2023.01)
(58) Field of Classification Search
  CPC ............ H04W 74/0816; H04W 24/02; H04W 72/0453; H04B 7/0626
  See application file for complete search history.

(56) References Cited

U.S. PATENT DOCUMENTS

| | | | | |
|---|---|---|---|---|
| 2019/0200379 | A1* | 6/2019 | Wang | H04W 72/1289 |
| 2019/0200389 | A1* | 6/2019 | Li | H04W 72/0453 |
| 2019/0268939 | A1* | 8/2019 | Yang | H04W 74/08 |
| 2020/0389821 | A1* | 12/2020 | Li | H04W 28/26 |

FOREIGN PATENT DOCUMENTS

| | | |
|---|---|---|
| CN | 106538027 A | 3/2017 |
| CN | 107135497 A | 9/2017 |
| CN | 107734560 A | 2/2018 |
| CN | 107852752 A | 3/2018 |
| CN | 107888256 A | 4/2018 |
| CN | 107889113 A | 4/2018 |
| WO | 2018062966 A | 4/2018 |
| WO | 2018067226 A1 | 4/2018 |

OTHER PUBLICATIONS

MediaTek Inc.,"Considerations on NR Unlicensed Channel Access", 3GPP TSG RAN WG1 Meeting #92, Athens, Greece, Feb. 26-Mar. 2, 2018, total 4 pages, R1-1801656.

Qualcomm Incorporated,"TxOP Frame Structure for NR unlicensed", 3GPP TSG RAN WG1 Meeting #92bis, Sanya, China Apr. 15-Apr. 20, 2018, total 8 pages, R1-1804829.

InterDigital Inc.,"On LBT for Beam-Based Transmission for NR-U", 3GPP TSG RAN WG1 Meeting #92bis, Sanya, China, Apr. 16-20, 2018, total 6 pages, R1-1804885.

Qualcomm Incorporated,"Advanced Frame Structure", 3GPP TSG-RAN WG1 #86bis, Oct. 10-14, 2016, Lisbon, Portugal, total 9 pages, R1-1610132.

Samsung, "Channel Access for NR Unlicensed Operation", 3GPP TSG-RAN WG1 Meeting #AH 1801, Vancouver, Canada, Jan. 22-26, 2018, total 4 pages, R1-1800478.

Samsung, "Potential physical layer procedures for NR-U", 3GPP TSG RAN WG1 Meeting #92, Sanya, China, Apr. 16-Apr. 20, 2018, total 7 pages, R1-1804405.

* cited by examiner

DATA TRANSMISSION METHOD AND DEVICE, AND SIGNAL FEEDBACK METHOD AND DEVICE

The present application is a National Stage of International Application No. PCT/CN2019/085888, filed on May 7, 2019, which claims priority to China Patent Application No. 201810450590.6, filed on May 11, 2018 in China Patent Office and entitled "DATA TRANSMISSION METHOD AND DEVICE, AND SIGNAL FEEDBACK METHOD AND DEVICE", both of which are hereby incorporated by reference in their entirety.

FIELD

The present application relates to the field of wireless communication, and more particularly relates to a data transmission method and device, and a signal feedback method and device.

BACKGROUND

No specific application system is planned for an unlicensed spectrum, and the unlicensed spectrum can be shared by a variety of wireless communication systems. Existing communication systems of the unlicensed spectrum at the present mainly include IEEE standardized Bluetooth, WiFi and 3GPP standardized long term evolution in unlicensed spectrum (LTE-U); and the various systems use shared unlicensed spectrum resources by means of preempting resources.

In order to ensure a friendly coexistence of the LTE-U and the WiFi, 3GPP launches a deep discussion on a listen before talk (LBT) technology, and four LBT solutions are provided.
  Cat.1: No LBT;
  Cat.2: LBT without random back-off;
  Cat.3: LBT with random back-off with fixed size of contention window;
  Cat. 4: LBT with random back-off with variable size of contention window.

Finally, two LBT mechanisms are standardized, namely LBT cat.2 and LBT cat.4 defined by 3GPP.

A transmission distance of the unlicensed spectrum is generally relatively short.

Perhaps, a coverage radius is no longer the main reason for beam-based transmission, but the introduction of the beam-based transmission brings new changes to LBT mechanisms. For NR in unlicensed spectrum (NR-U, NR: new radio access technology) based on beam-based transmission, it is obvious that direction-related LBT, i.e., directional LBT, can be considered. Implementation of the directional LBT will provide more transmission opportunities for NR-U.

The disadvantage of the prior art is that the directional LBT will cause a relatively serious hidden node problem, but there is no solution to avoid the hidden node problem in the prior art.

SUMMARY

The present application provides a data transmission method and device, and a signal feedback method and device, which are used to solve the problem of data transmission interference caused by an interfering node in long term evolution in an unlicensed spectrum (LTE-U).

An embodiment of the present application provides a data transmission method, including:

sending, by a base station, a channel occupation request signal to request channel occupation to a terminal, after the base station performs a listen before talk (LBT) operation in a direction corresponding to at least one beam; and transmitting, by the base station, data on a beam sending the channel occupation request signal, after the base station receives a signal indicating that a channel is allowed to be occupied.

During implementation, waiting, by the base station, on the beam, to receive the signal indicating that the channel is allowed to be occupied, after the base station sends the channel occupation request signal to the terminal on the beam; and/or, sending, by the base station, on a next beam, to the terminal a channel occupation request signal, and receives, on the beam sending the channel occupation request signal, a corresponding signal indicating that a channel is allowed to be occupied, after the base station sends the channel occupation request signal to the terminal on the beam.

During implementation, the beam sending the channel occupation request signal refers to all or part of beams on which channels are detected to be idle after the base station performs, according to a time order, the LBT operation in the direction corresponding to the at least one beam.

During implementation, a beam on which the LBT operation is performed is at least one beam in a space, and/or, at least one beam determined and configured by a network in advance.

During implementation, a beam on which the LBT operation is performed is determined according to prior information.

During implementation, the prior information is transmission performance information indicating whether a synchronization signal block (SSB) may be correctly transmitted, or transmission performance information, acquired in an SSB transmission process, of the beam.

During implementation, the performing for the LBT operation includes one of the following modes or a combination of the following modes:

continuously performing, in a direction corresponding to a beam, the LBT operation until the LBT operation is successful; or, performing the LBT operation in a direction corresponding to a beam within a preset time period, and if the LBT operation is not successful, performing the LBT operation in a direction corresponding to other beam; or, performing the LBT operation in a direction corresponding to each of beams by means of sequential time division of scanning for beams.

During implementation, the performing for the LBT operation includes one of the following modes or a combination of the following modes:

maintaining, by the base station, one counter; and performing, by the base station, the LBT operation in a direction corresponding to one beam until the LBT operation is successful; or, maintaining, by the base station, one counter; performing, by the base station, the LBT operation in a direction corresponding to one beam until the operation is performing beyond a preset time period; and if the LBT is not successful resetting, by the base station, a value of the one counter, and performing, by the base station, the LBT operation in a direction corresponding to other beam; or, maintaining, by the base station, a plurality of counters; performing, by the base station, the LBT operation in a direction corresponding to one beam until the operation is performed beyond the preset time period; and if the LBT is not successful, switching, by the base station, to other counter of the plurality of counters other than one counter, corresponding to the one beam, of the plurality of counters, performing, by the base station, the LBT operation in a direction corresponding to other beam, and retaining, by the base station, values of the plurality of counters; or, maintaining, by the base station, a plurality of counters; performing, by the base station, the LBT operation in a direction corresponding to one beam until the operation is performed beyond the preset time period; and if the LBT is not successful, switching, by the base station, to other counter of the plurality of counters other than one counter, corresponding to the one beam, of the plurality of counters, performing, by the base station, the LBT operation in a direction corresponding to other beam, retaining, by the base station, values of the plurality of counters, and resetting, by the base station, values of the plurality of counters after a number of times of the performing for the LBT operation beyond the preset time period is greater than a preset value; or, maintaining, by the base station, a plurality of counters; and performing, by the base station, the LBT operation in a direction corresponding to each of beams by means of sequential time division of scanning for the beams; and time granularity of scanning is configurable.

During implementation, the time granularity of scanning is an integral multiple of a clear channel assessment (CCA) slot or an integral multiple of an orthogonal frequency division multiplex (OFDM) symbol.

During implementation, the method further includes:
stopping, by the base station, performing the LBT operation or continuing, by the base station, to perform the LBT operation, after the base station receives the signal indicating that the channel is allowed to be occupied.

During implementation, the channel occupation request signal includes one of the following information or a combination of the following information:
information of a scheduled user equipment identity (UEID), a beam ID of the beam sending the channel occupation request signal, position information, in the space, of the beam sending the channel occupation request signal, channel occupation time information of the beam sending the channel occupation request signal, a resource configuration required in the condition that the terminal feeds back the signal indicating that the channel is allowed to be occupied, LBT type information required in the condition that the terminal feeds back the signal indicating that the channel is allowed to be occupied, or pilot frequency information used for measuring channel quality.

During implementation, the signal indicating that the channel is allowed to be occupied is fed back by means of interlace information dynamically indicated by the base station; and/or,
the signal indicating that the channel is allowed to be occupied is fed back by means of interlace information semi-statically configured for the terminal by a network.

During implementation, the signal indicating that the channel is allowed to be occupied is fed back according to interlace information indicated by the base station.

During implementation, the signal indicating that the channel is allowed to be occupied is fed back by means of time information configured for the terminal by the base station; or,
the signal indicating that the channel is allowed to be occupied is fed back by each terminal at the same time.

During implementation, the method further includes:
configuring, by the base station, for the terminal an LBT parameter required to be used to feed back the signal indicating that the channel is allowed to be occupied.

During implementation, the LBT parameter includes a size of a counter or size information of a contention window used for producing the counter, in the condition that an LBT type in the LBT parameter is LBT cat.4.

During implementation, the method further includes:
transmitting, by the base station, the data on a beam with most multiplexing users or a beam with largest transmission capacity, in the condition that the base station receives, on a plurality of beams, the signal indicating that the channel is allowed to be occupied.

During implementation, the method further includes:
scheduling, by the base station, a user having a successful handshake between the channel occupation request signal and the signal indicating that the channel is allowed to be occupied to transmit data, in the condition that the base station receives, on a plurality of beams, the signal indicating that the channel is allowed to be occupied; and/or,
transmitting, by the base station, the data on a beam on which a ratio of the number of users sending the signal indicating that the channel is allowed to be occupied to the number of users receiving the channel occupation request signal is greater than a preset value, in the condition that the base station receives, on a plurality of beams, the signal indicating that the channel is allowed to be occupied.

During implementation, the data is transmitted on an LBT time-superior beam which is selected from the beams on which the ratio of the number of users sending the signal indicating that the channel is allowed to be occupied to the number of users receiving the channel occupation request signal is greater than the preset value.

During implementation, the channel occupation request signal is sent by using subcarriers of 60 K and more than 60 K.

During implementation, a gap between handshaking signals of the channel occupation request signal and the signal indicating that the channel is allowed to be occupied is an integral multiple of the OFDM symbol.

During implementation, the gap between the channel occupation request signal and the signal indicating that the channel is allowed to be occupied is 1 OFDM symbol, in the condition that the channel occupation request signal is sent by using a subcarrier of 60 K; or
the gap between the channel occupation request signal and the signal indicating that the channel is allowed to be occupied is 2-3 OFDM symbols, in the condition that the channel occupation request signal is sent by using a subcarrier of 120 K; or
the gap between the channel occupation request signal and the signal indicating that the channel is allowed to be occupied is 4-6 OFDM symbols, in the condition that the channel occupation request signal is sent by using a subcarrier of 240 K; or
the gap between the channel occupation request signal and the signal indicating that the channel is allowed to be occupied is 8-12 OFDM symbols, in the condition that the channel occupation request signal is sent by using a subcarrier of 480 K.

During implementation, a value of the gap is informed by the base station to the terminal by means of signaling, or is pre-determined by the network and the terminal.

During implementation, LBT cat.1 is used to perform the LBT operation, in the condition that a beam correspondence is not be guaranteed.

An embodiment of the present application provides a signal feedback method, including:

receiving, by a terminal, a channel occupation request signal sent by a base station on at least one beam, and the channel occupation request signal is a signal for requesting channel occupation; and feeding back, by the terminal, a signal indicating that a channel is allowed to be occupied on a beam on which the channel occupation request signal is received to the base station, after the terminal receives the channel occupation request signal correctly.

During implementation, the signal indicating that the channel is allowed to be occupied includes one of the following information or a combination of the following information:

information related to channel occupation time, ID information of the beam, user equipment identity (UEID) information of the terminal, beam-based channel quality indicator (CQI) information.

During implementation, the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network.

During implementation, the signal indicating that the channel is allowed to be occupied is fed back according to interlace information indicated by the base station.

During implementation, the signal indicating that the channel is allowed to be occupied is fed back by means of time information configured for the terminal by the base station.

During implementation, the method further includes:

receiving, by the terminal, a listen before talk (LBT) parameter which is configured for the terminal by the base station and required to be used to feed back the signal indicating that the channel is allowed to be occupied; and feeding back, by the terminal, the signal indicating that the channel is allowed to be occupied to the base station, after an LBT operation is performed in a direction, corresponding to the beam on which the signal is received, according to the LBT parameter.

During implementation, the LBT operation is performed according to a size, included in the LBT parameter, of a counter or size information, included in the LBT parameter, of a contention window used for producing the counter, in the condition that an LBT type in the LBT parameter is LBT cat.4.

During implementation, the channel occupation request signal is sent by using subcarriers of 60 K and more than 60 K.

During implementation, a gap between handshaking signals of the signal for requesting channel occupation and the signal indicating that the channel is allowed to be occupied is an integral multiple of an OFDM symbol.

During implementation, the gap between the signal for requesting the channel occupation and the signal indicating that the channel is allowed to be occupied is 1 OFDM symbol, in the condition that the channel occupation request signal is sent by using a subcarrier of 60 K; or, the gap between the signal for requesting the channel occupation and the signal indicating that the channel is allowed to be occupied is 2-3 OFDM symbols, in the condition that the channel occupation request signal is sent by using a subcarrier of 120 K; or, the gap between the signal for requesting the channel occupation and the signal indicating that the channel is allowed to be occupied is 4-6 OFDM symbols, in the condition that the channel occupation request signal is sent by using a subcarrier of 240 K; or, the gap between the signal for requesting the channel occupation and the signal indicating that the channel is allowed to be occupied is 8-12 OFDM symbols, in the condition that the channel occupation request signal is sent by using a subcarrier of 480 K.

During implementation, a value of the gap is informed by the base station to the terminal by means of signaling, or is pre-determined by the network and the terminal.

An embodiment of the present application provides a base station. The base station includes:

a processor, configured to read a program in a memory and process data according to a requirement of a transceiver; and the transceiver, configured to receive and transmit data under the control of the processor, and configured to:

send a channel occupation request signal to request channel occupation to a terminal, after the base station performs a listen before talk (LBT) operation in a direction corresponding to at least one beam, and transmit data on a beam sending the channel occupation request signal, after the base station receives a signal indicating that a channel is allowed to be occupied.

During implementation, the base station waits, on the beam, to receive the signal indicating that the channel is allowed to be occupied, after the base station sends the channel occupation request signal to the terminal on the beam; and/or, the base station continues to send, on a next beam, to the terminal a channel occupation request signal, and receives, on the beam sending the channel occupation request signal, a corresponding signal indicating that a channel is allowed to be occupied, after the base station sends the channel occupation request signal to the terminal on the beam.

During implementation, the beam sending the channel occupation request signal refers to all or part of beams on which channels are detected to be idle after the base station performs, according to a time sequence, the LBT operation in the direction corresponding to the at least one beam.

During implementation, the beam on which the LBT operation is performed is at least one beam in a space, and/or, at least one beam determined and configured by a network in advance.

During implementation, the beam on which the LBT operation is performed is determined according to prior information.

During implementation, the prior information is: transmission performance information of a beam for transmitting a synchronization signal block (SSB), or transmission performance information, acquired in an SSB transmission process, of the beam.

During implementation, the performing for the LBT operation includes one of the following modes or a combination of the following modes:

continuously performing, in a direction corresponding to a beam, the LBT operation until the LBT operation is successful; or, performing the LBT operation in a direction corresponding to a beam within a preset time period, and if the LBT is not successful, performing the LBT operation in a direction corresponding to other beam; or, performing the LBT operation in a direction corresponding to each of beams by means of sequential time division of scanning for beams.

During implementation, the performing for the LBT operation includes one of the following modes or a combination of the following modes:

the base station maintains one counter, and performs the LBT operation in a direction corresponding to one beam until the LBT operation is successful; or, the base station maintains one counter, and performs the LBT operation in a direction corresponding to one beam until the operation is performed beyond the preset time period; if the LBT is not successful, the base station resets a value of the one counter, and performs the LBT operation in a direction corresponding to other beam; or, the base station maintains a plurality of counters; the base station performs the LBT operation in a direction corresponding to one beam until the operation is performed beyond the preset time period; and if the LBT is not successful, the base station switches to other counter of the plurality of counters other than one counter, corresponding to the one beam, of the plurality of counters, performs the LBT operation in a direction corresponding to other beam, and retains values of the plurality of counters; or, the base station maintains a plurality of counters; the base station performs the LBT operation in a direction corresponding to one beam until the operation is performed beyond the preset time period; if the LBT is not successful, the base station switches to other counter of the plurality of counters other than one counter, corresponding to the one beam, of the plurality of counters, performs the LBT operation in a direction corresponding to other beam, retains values of the plurality of counters, resets the values after a number of times of the performing for the LBT operation beyond the preset time period is greater than a preset value; or, the base station maintains a plurality of counters, and performs the LBT operation in a direction corresponding to each of beams by means of sequential time division of scanning for beams; and time granularity of scanning is configurable.

During implementation, the time granularity of scanning is an integral multiple of a CCA slot or an integral multiple of an OFDM symbol.

During implementation, the base station stops performing the LBT operation or continuing to perform the LBT operation, after the base station receives the signal indicating that the channel is allowed to be occupied.

During implementation, the channel occupation request signal includes one of the following information or a combination of the following information:

information of a scheduled user equipment identity (UEID), a beam ID of the beam sending the channel occupation request signal, position information, in the space, of the beam sending the channel occupation request signal, channel occupation time information of the beam sending the channel occupation request signal, a resource configuration required in the condition that the terminal feeds back the signal indicating that the channel is allowed to be occupied, LBT type information required in the condition that the terminal feeds back the signal indicating that the channel is allowed to be occupied, or pilot frequency information used for measuring channel quality.

During implementation, the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network.

During implementation, the signal indicating that the channel is allowed to be occupied is fed back according to interlace information indicated by the base station.

During implementation, the signal indicating that the channel is allowed to be occupied is fed back by means of time information configured for the terminal by the base station; or, the signal indicating that the channel is allowed to be occupied is fed back by each terminal at the same time.

During implementation, the base station configures for the terminal an LBT parameter required to be used to feed back the signal indicating that the channel is allowed to be occupied.

During implementation, the LBT parameter includes a size of a counter or size information of a contention window used for producing the counter, in the condition that an LBT type in the LBT parameter is LBT cat.4.

During implementation, the base station transmits the data on a beam with most multiplexing users or a beam with largest transmission capacity, in the condition that the base station receives, on a plurality of beams, the signal indicating that the channel is allowed to be occupied.

During implementation, the base station schedules a user having a successful handshake between the channel occupation request signal and the signal indicating that the channel is allowed to be occupied to transmit data, in the condition that the base station receives, on a plurality of beams, the signal indicating that the channel is allowed to be occupied; and/or, the base station, data on the base station receives, on a plurality of beams, the signal indicating that the channel is allowed to be occupied, the base station transmits the data on a beam on which a ratio of the number of users sending the signal indicating that the channel is allowed to be occupied to the number of users receiving the channel occupation request signal is greater than a preset value.

During implementation, the data is transmitted on an LBT time-superior beam which is selected from the beams on which the ratio of the number of users sending the signal indicating that the channel is allowed to be occupied to the number of users receiving the channel occupation request signal is greater than the preset value.

During implementation, the channel occupation request signal is sent by using subcarriers of 60 K and more than 60 K.

During implementation, a gap between handshaking signals of the channel occupation request signal and the signal indicating that the channel is allowed to be occupied is an integral multiple of the OFDM symbol.

During implementation, the gap between the channel occupation request signal and the signal indicating that the channel is allowed to be occupied is 1 OFDM symbol, in the condition that the channel occupation request signal is sent by using a subcarrier of 60 K; or, the gap between the channel occupation request signal and the signal indicating that the channel is allowed to be occupied is 2-3 OFDM symbols, in the condition that the channel occupation request signal is sent by using a subcarrier of 120 K; or, the gap between the channel occupation request signal and the signal indicating that the channel is allowed to be occupied is 4-6 OFDM symbols, in the condition that the channel occupation request signal is sent by using a subcarrier of 240 K; or, the gap between the channel occupation request signal and the signal indicating that the channel is allowed to be occupied is 8-12 OFDM symbols, in the condition that the channel occupation request signal is sent by using a subcarrier of 480 K.

During implementation, a value of the gap is informed by the base station to the terminal by means of signaling, or is pre-determined by the network and the terminal.

During implementation, LBT cat.1 is used to perform the LBT operation, in the condition that a beam correspondence is not be guaranteed.

An embodiment of the present application provides a terminal. The terminal includes:

a processor, configured to read a program in a memory and process data according to a requirement of a transceiver;

the transceiver, configured to receive and transmit data under the control of the processor, and configured to:

receive a channel occupation request signal sent to the terminal by a base station on at least one beam, and the channel occupation request signal is a signal for requesting channel occupation; and feedback, a signal indicating that the channel is allowed to be occupied on a beam on which the channel occupation request signal is received, to the base station, after the terminal receives the channel occupation request signal correctly.

During implementation, the signal indicating that the channel is allowed to be occupied includes one of the following information or a combination of the following information:

information related to channel occupation time, ID information of the beam, user equipment identity (UEID) information of the terminal, beam-based channel quality indicator (CQI) information.

During implementation, the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network.

During implementation, the signal indicating that the channel is allowed to be occupied is fed back according to interlace information indicated by the base station.

During implementation, the signal indicating that the channel is allowed to be occupied is fed back by means of time information configured for the terminal by the base station.

During implementation, the terminal receives a listen before talk (LBT) parameter which is configured for the terminal by the base station and required to be used to feed back the signal indicating that the channel is allowed to be occupied;

the terminal feeds back the signal indicating that the channel is allowed to be occupied to the base station, after an LBT operation is performed in a direction, corresponding to the beam on which the signal is received, according to the LBT parameter.

During implementation, the LBT operation is performed according to a size, included in the LBT parameter, of a counter or size information, included in the LBT parameter, of a contention window used for producing the counter, in the condition that an LBT type in the LBT parameter is LBT cat.4.

During implementation, the channel occupation request signal is sent by using subcarriers of 60 K and more than 60 K.

During implementation, a gap between handshaking signals of the signal for requesting channel occupation and the signal indicating that the channel is allowed to be occupied is an integral multiple of an OFDM symbol.

During implementation, the gap between the signal for requesting the channel occupation and the signal indicating that the channel is allowed to be occupied is 1 OFDM symbol, in the condition that the channel occupation request signal is sent by using a subcarrier of 60 K; or, the gap between the signal for requesting the channel occupation and the signal indicating that the channel is allowed to be occupied is 2-3 OFDM symbols in the condition that the channel occupation request signal is sent by using a subcarrier of 120 K; or, the gap between the signal for requesting the channel occupation and the signal indicating that the channel is allowed to be occupied is 4-6 OFDM symbols, in the condition that the channel occupation request signal is sent by using a subcarrier of 240 K; or, the gap between the signal for requesting the channel occupation and the signal indicating that the channel is allowed to be occupied is 8-12 OFDM symbols, in the condition that the channel occupation request signal is sent by using a subcarrier of 480 K.

During implementation, a value of the gap is informed by the base station to the terminal by means of signaling, or is pre-determined by the network and the terminal.

An embodiment of the present application provides a data transmission device, including:

a sending device, configured to send a channel occupation request signal to request channel occupation to a terminal after a listen before talk (LBT) operation is performed in a direction corresponding to at least one beam; and a transmission device, configured to transmit data on a beam sending the occupation request signal after a signal indicating that a channel is allowed to be occupied is received.

An embodiment of the present application provides a signal feedback device, including:

a receiving device, configured to receive a channel occupation request signal sent to a terminal by a base station on at least one beam, and the channel occupation request signal is a signal for requesting channel occupation; and a feedback device, configured to feedback a signal indicating that a channel is allowed to be occupied on a beam on which the signal is received to the base station, after the channel occupation request signal is correctly received.

The embodiments of the present application, after executing the LBT operation in the direction corresponding to the at least one beam, the base station may send to the terminal the channel occupation request signal to request the channel occupation; and after receiving the signal indicating that the channel is allowed to be occupied, the base station may transmit data on the beam sending the channel occupation request signal. The problem of data transmission interference caused by an interfering node can be avoided.

BRIEF DESCRIPTION OF THE DRAWINGS

The accompanying drawings described here are used to provide a further understanding of the present application and form a part of the present application. The schematic embodiments and descriptions of the present application are used to explain the present application and do not constitute an improper limitation on the present application. In the drawings.

DETAILED DESCRIPTION OF THE EMBODIMENTS

The inventors have noted the following in the disclosure process.

No specific application system is planned for an unlicensed spectrum, and the unlicensed spectrum can be shared by a variety of wireless communication systems. Existing communication systems of the unlicensed spectrum at the present mainly include IEEE standardized Bluetooth, WiFi and 3GPP standardized long term evolution in unlicensed spectrum (LTE-U); and the various systems use shared unlicensed spectrum resources by means of preempting resources.

In order to make sure that various communication systems coexist friendly in the unlicensed spectrum, both WiFi and LTE-U take listen before talk (LBT) as a basic measure for LTE-U contention access.

Figure 1:
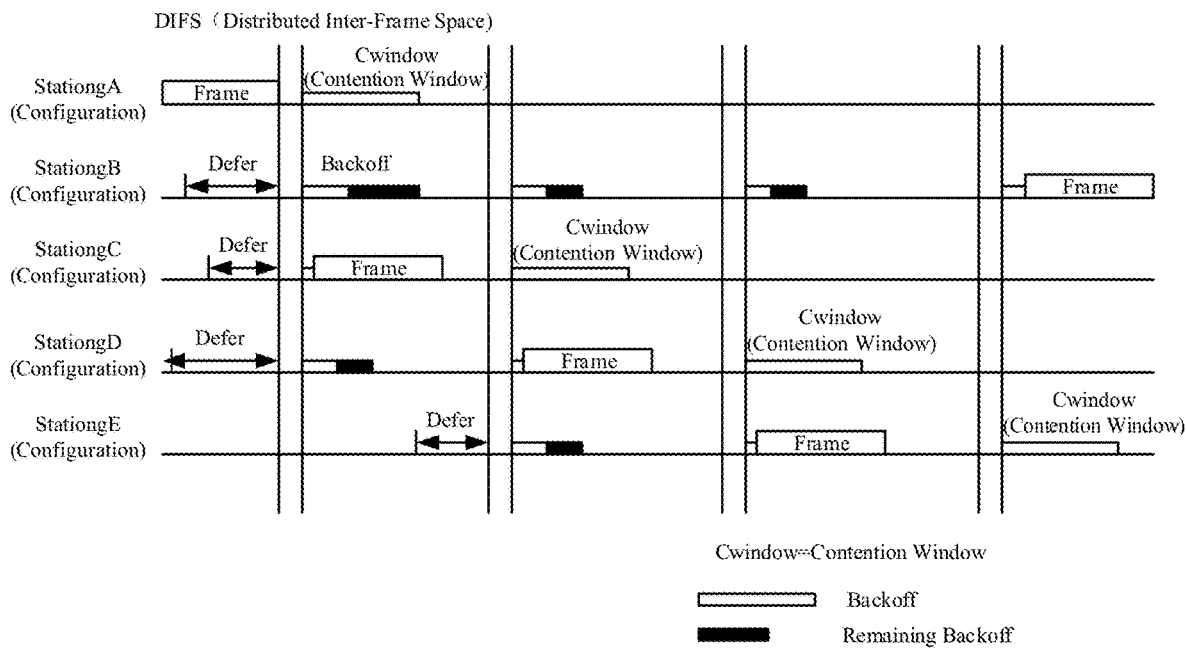
FIG. 1 is a schematic diagram of a resource preempting mode, in an unlicensed spectrum, of WiFi in embodiments of the present application.

A 802.11 system uses a channel access mechanism which is called a carrier sense multiple access/collision avoidance (CSMA/CA) mechanism. FIG. 1 is a schematic diagram of a resource preempting mode, in an unlicensed spectrum, of WiFi, and a resource preempting mode, in an unlicensed spectrum, of a WiFi system is as shown in FIG. 1. Firstly, a channel is listened. When the idle time of the channel reaches a distributed inter-frame space (DIFS), it is determined that the current channel is an idle channel, and then a station of each channel waiting for access goes to a random back-off stage to avoid collision of a plurality of stations at the same resource. In addition, in order to guarantee the fairness, it also stipulates that a stipulation that each station cannot occupy a spectrum resource for a long time is made, and should release the resource at time or an upper limit of a data transmission quantity, so that other WiFi or LTE systems can preempt the resource.

In the WiFi system, two access points (AP) that are relatively far from each other cannot listen to each other, and independently transmit data to two stations (STA). However, the two STAs are very close, and at this time, two WiFi mutually forms a hidden node. In order to solve the problem of the hidden node, WiFi also supports a request-to-send/clear-to-send protocol (RTS/CTS) handshaking mechanism. That is, when the AP broadcasts one RTS frame, if the STA receives the RTS, the STA will reply one CTS frame. The RTS/CTS handshaking mechanism carries time of channel occupation during transmission at this time. Therefore, a node nearby will stop accessing channels after receiving the CTS, thus avoiding the collision.

Figure 2:
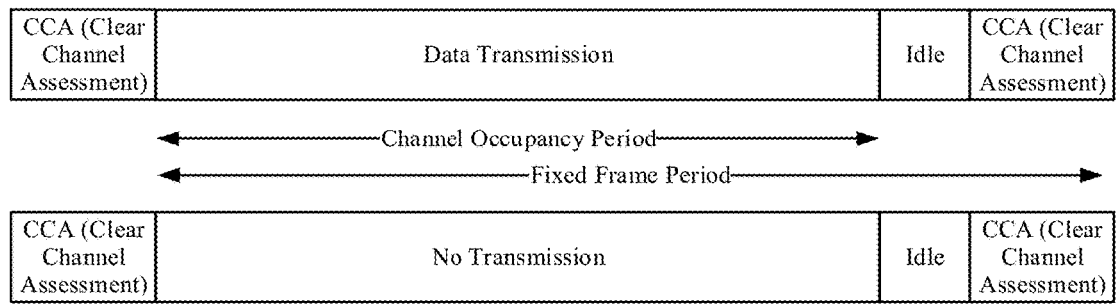
FIG. 2 is a schematic diagram of a European Telecommunications Standards Institute (ETSI) frame based equipment (FBE) channel access mechanism in embodiments of the present application.
Figure 3:
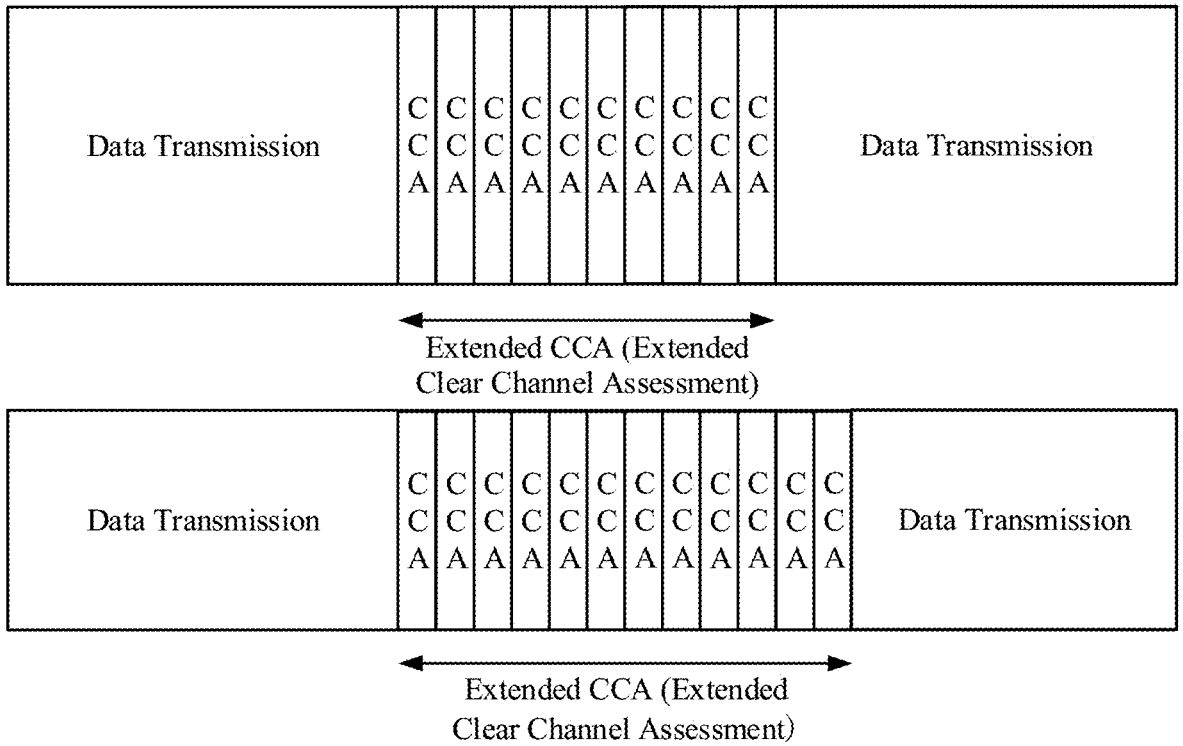
FIG. 3 is a schematic diagram of an ETSI LBE channel access mechanism in embodiments of the present application.

In order to provide a flexible and fair adaptive channel access mechanism, it is required in Europe to use an LBT technology in unlicensed 5150-5350 MHz and 5470-5725 MHz. An LBT process is similar to the CSMA/CA mechanism of WiFi. Each set of equipment should carry out clear channel assessment (CCA) detection before using the channel. The CCA uses energy detection to determine whether the current channel has signal transmission, to determine whether the channel is occupied. The ETSI standard classifies equipment in the unlicensed spectrum as being frame-based and load-based, which respectively correspond to two types of access mechanisms: FBE and load based equipment (LBE). FIG. 2 is a schematic diagram of an ETSI FBE channel access mechanism, and FIG. 3 is a schematic diagram of an ETSI LBE channel access mechanism. The channel access mechanisms of the FBE and the LBE are as shown in FIG. 2 and FIG. 3, respectively.

In the channel access mechanism of the FBE, the FBE accesses to a fixed frame structure position to perform CCA detection. If one CCA period (not less than 20 us) of the channel is determined to be idle, the channel is accessed immediately to initiate a data transmission process. Channel transmission time and Channel occupation time of the channel are relatively fixed, 1 ms at least and 10 ms at most. The idle period shall be at least 5% of the channel occupation time. The equipment performs new CCA detection within the CCA time at the end of the idle period to access the channel again. In the FBE mechanism, the channel occupation time is added with the idle period to form a fixed value called a frame period.

In the channel access mechanism of the LBE, the channel occupation time and the start point are variable at each transmission. Before the channel is acquired, the CCA detection needs to be expanded. Firstly, a random factor N is generated according to the size q of a contention window (CW), and the channel is accessed to initiate the data transmission process until the idle time of the channel reaches N times of the CCA time and the channel is idle. The maximum channel occupation time is 13 ms.

In order to realize friendly coexistence between LTE-U and WiFi, a deep discussion is developed for an LBT technology. Finally, two LBT mechanisms are standardized, namely LBT cat.2 and LBT cat.4 defined by 3GPP. The LBT cat.2 is similar to the FBE and does not use a random back-off mechanism, but uses fixed CCA time, such as 20 us. The LBT cat.4 is highly similar to the CSMA/CA mechanism of WiFi. An eNB will first perform energy detection-based CCA detection, and the time is configurable. This CCA detection is called initial CCA (ICCA). If the energy level of the ICCA is lower than a predetermined threshold, the channel is determined to be idle, and the equipment transmits the data immediately, otherwise, the current channel is occupied, and the equipment will perform extension CCA (ECCA) detection. The eNB first generates, according to the size q of the CW, a counter value N that needs to be counted down, and the counter value is subtracted by 1 when one idle CCA slot is found. When a counter value is 0, the channel is accessed to initiate the data transmission process.

In order to increase the data rate and improve the coverage of high spectrum, a massive multiple input multiple output (MIMO) technology is used in a new radio access technology (NR), especially in a millimeter wave spectrum, most transmission nodes use massive MIMO-based beam-forming data transmission. The biggest feature of beam-based transmission is that there are a plurality of possible transmission beams in a space. A base station and a terminal need to determine a best pair of sending and receiving beams. An initial access stage is stipulated in NR. First, the base station sends, on each beam, a synchronization signal block (SSB), and the terminal determines the best sending beam and feeds it back to the base station. During data transmission, semi-static configuration may be realized by means of a media access control control element (MAC CE), control element), or a physical downlink control channel (PDCCH) can be used to instruct the terminal to receive data beam changes.

Figure 4:
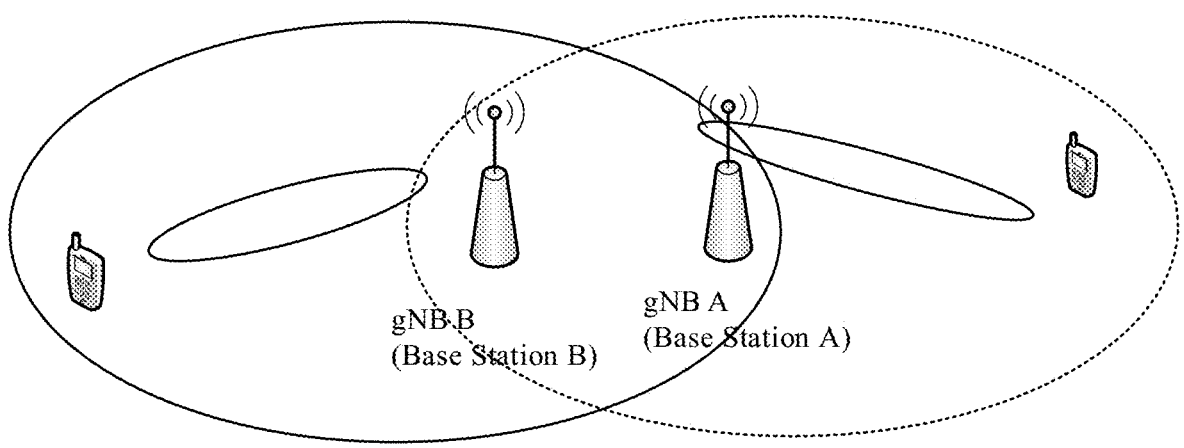
FIG. 4 is a schematic diagram of beam-based space multiplexing in embodiments of the present application.

The transmission distance of the unlicensed spectrum is generally relatively short. Perhaps, a coverage radius is no longer the main reason for beam-based transmission, but the introduction of the beam-based transmission brings new changes to the LBT mechanisms. The aforementioned CSMA/CA mechanism and LBT cat.2 and LBT cat.4 channel access mechanisms used by WiFi and LTE-U are actually omnidirectional LBTs. For NR-U based on beam-based transmission (NR in the unlicensed spectrum), it is obvious that direction-related LBT, i.e., directional LBT, can be considered. Implementation of the directional LBT will provide more transmission opportunities for NR-U. FIG. 4 is a schematic diagram of beam-based spatial multiplexing. As shown in FIG. 4, assuming that a gNB A, a gNB and an AP are very close, and can hear each other if an omnidirectional LBT is used, only one node can access the channel at the same time. With the directional LBT, the gNB and WiFi will transmit data on different beams at the same time without interfering with each other.

Figure 5:
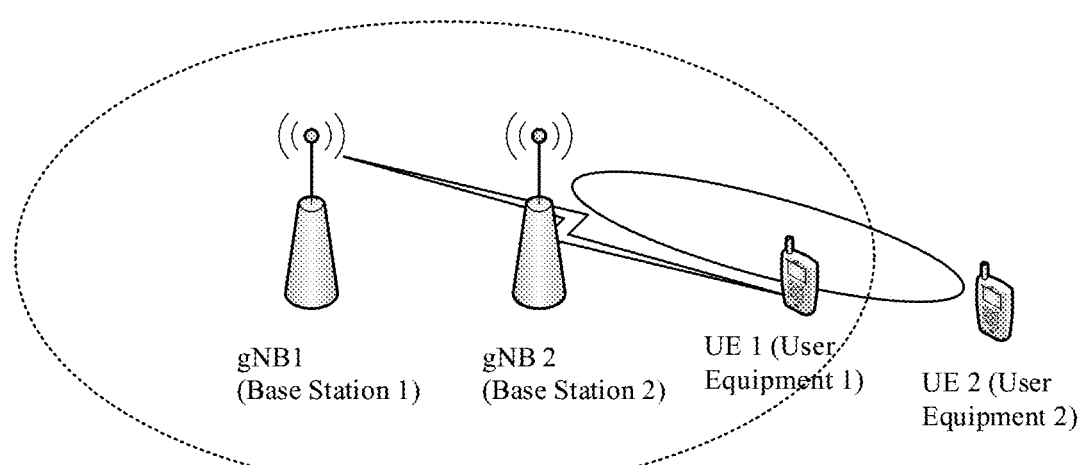
FIG. 5 is a schematic diagram of coexistence of licensed assisted access (LAA) and NR-U in embodiments of the present application.
Figure 6:
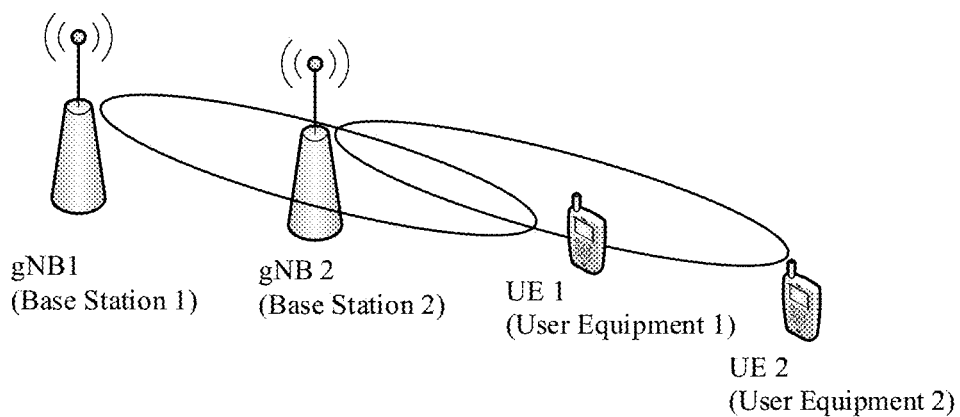
FIG. 6 is a schematic diagram of coexistence of NR-U and NR-U in embodiments of the present application.

However, the directional LBT will bring a relatively serious problem of hidden nodes. FIG. 5 is a schematic diagram of coexistence of LAA and NR-U. As shown in FIG. 5, a gNB1 using omnidirectional transmission LAA firstly accesses the channel to transmit data to UE1, and a receiving beam of the other gNB2 using the directional LBT cannot receive a signal sent by the gNB1. It is considered that the channel is idle, and then is accessed to initiate transmission to UE2, so that the signals sent by the gNB1 and the gNB2 will collide with each other at the UE1 and the UE2. FIG. 6 is a schematic diagram of coexistence of NR-U and NR-U. If the eNB of the LAA in FIG. 5 is replaced with the gNB of one NR-U, the same problem still exists, as shown in FIG. 6.

As mentioned earlier, in order to avoid the problem of the hidden nodes of WiFi, the RTS/CTS handshaking mechanism is proposed. This RTS/CTS handshaking mechanism can be applied to the NR-U, and it is necessary to study how to use this handshaking mechanism to solve the aforementioned coexistence problem according to the characteristics of the NR-U.

With the continuous growth of mobile data business volume, spectrum resources are becoming lesser and lesser, and only using licensed spectrum resources for network deployment and business transmission may no longer meet the requirement of the business volume. Therefore, the 3GPP has standardized the transmission of LTE in the unlicensed spectrum. At the present, the first version of 5G has been frozen. Similar to the LTE-U, applying the NR technology of the licensed spectrum to the unlicensed spectrum is required to be subject to deep research according to new characteristics of 5G. At the present, there is no clear plan for how an NR system works on unlicensed spectrum resources. Therefore, an embodiment of the present application provides data transmission and signal feedback solutions for the NR system on the unlicensed spectrum resources. The specific implementation modes of the present application will be described below with reference to the drawings.

In the description process, the description will be made from the implementation of a terminal side and the a base station side respectively, and then an example of coordinating implementation of the terminal side and the base station side will also be provided to better understand the implementation of the solutions proposed in the embodiments of the present application. Such a description manner does not mean that the base station and the terminal must be implemented together or must be implemented separately. In fact, when the terminal and the base station are implemented separately, the problems on the terminal side and the base station side are solved respectively. When the terminal and the base station are combined for use, better effects may be achieved.

Figure 7:
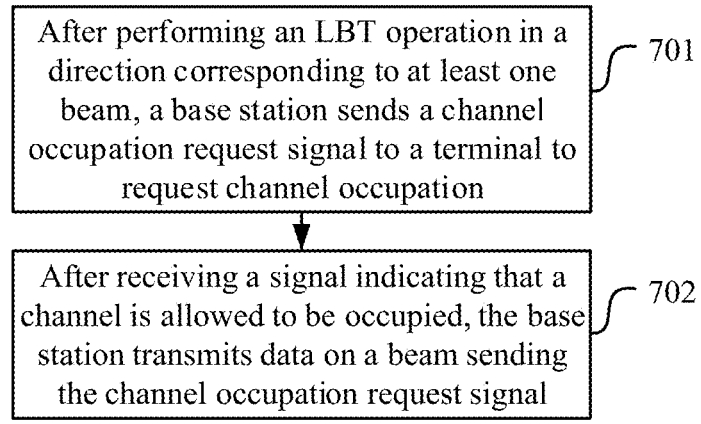
FIG. 7 is a schematic diagram of an implementation flow of a data transmission method on a base station side in embodiments of the present application.

FIG. 7 is a schematic diagram of an implementation flow of a data transmission method on a base station side. As shown in FIG. 7, a method may include the following steps.

Step 701, after performing an LBT operation in a direction corresponding to at least one beam, a base station sends a channel occupation request signal to a terminal to request channel occupation.

Step 702, after receiving a signal indicating that a channel is allowed to be occupied, the base station transmits data on a beam sending the channel occupation request signal.

Figure 8:
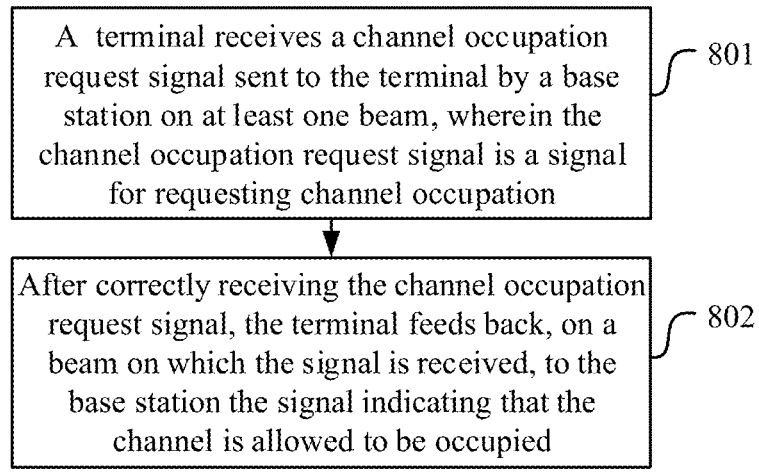
FIG. 8 is a schematic diagram of an implementation flow of a signal feedback method on a terminal side in embodiments of the present application.

FIG. 8 is a schematic diagram of an implementation flow of a signal feedback method on a terminal side. As shown in FIG. 8, the method may include the following steps.

Step 801, a terminal receives a channel occupation request signal sent by the base station on the at least one beam, and the channel occupation request signal is a signal for requesting channel occupation.

Step 802, after correctly receiving the channel occupation request signal, the terminal feeds back, on the beam on which the signal is received, to the base station the signal indicating that the channel is allowed to be occupied.

During implementation, the base station first sends, on a plurality of beams in sequence, the channel occupation request signal, and the terminal may reply, on the plurality of beams or one beam, the signal indicating that the channel is allowed to be occupied. The base station successfully decodes the signal indicating that the channel is allowed to be occupied, which is sent by the terminal, and transmits data.

During implementation, correct receiving indicates that the UE can correctly decode this signal. If there is no other strong interference at the UE, it is indicated that no other nodes being transmitting exist near the UE. Similarly, if the UE can correctly decode and feedback the signal indicating the occupation allowance, only the base station can decode the signal successfully and acquire the signal. A beam for feedback and a beam for receiving are sometimes inconsistent, and handshaking is successful only when the base station correctly decodes a handshaking signal.

Specific implementations are described below in combination with embodiments.

Embodiment 1

The embodiments on a base station side detail as below.

A beam sending a channel occupation request signal refers to all or part of beams on which channels are detected to be idle after a base station performs an LBT operation according to time order in a direction corresponding to at least one beam.

A beam on which the LBT operation is performed refers to all possible beams in a space, and/or, refers to part of possible beams determined and configured in a network in advance.

The channel occupation request signal includes one of the following information or a combination of the following information: information of a scheduled user equipment identity (UEID), a beam ID of the beam sending the channel occupation request signal, position information, in the space, of the beam sending the channel occupation request signal, channel occupation time information of the beam sending the channel occupation request signal, a resource configuration required when the terminal feeds back the signal indicating that the channel is allowed to be occupied, LBT type information required when the terminal feeds back the signal indicating that a channel is allowed to be occupied, or pilot frequency information used for measuring channel quality.

When the base station receives, on a plurality of beams, the signal indicating that the channel is allowed to be occupied, a beam with most multiplexing users or a beam with largest transmission capacity is used to transmit data.

Correspondingly, on a terminal side: the signal indicating that the channel is allowed to be occupied includes one of the following information or a combination of the following information: information related to channel occupation time, ID information of the beam, UEID information of the terminal, beam-based channel quality indicator (CQI) information.

In one embodiment, the base station first performs the LBT operation according to time order in directions corresponding to a plurality of beams. The plurality of beams can be all possible beams in a space, or part of possible beams determined and configured in a network in advance. The case of only one beam can be taken as a special case and is not excluded, and can also be implemented in the same way; the LBT can be a directional LBT.

The base station sends, on all or part of the beams on which the channel is detected to be idle, a beam-based channel occupation request signal. The channel occupation request signal may include:

information of a scheduled UEID; and information of the beam sending the channel occupation request signal.

In addition to an identifier of a beam ID, the information of the beam may further include position information of the beam in the space, such as an angle of the beam and other related information that can determine the position of the beam.

The channel occupation request signal may also include channel occupation time information, such as initial occupation time and its maximum channel occupation time.

The channel occupation request signal may also include a resource configuration required when the terminal feeds back the signal indicating that the channel is allowed to be occupied, and LBT type information required when the terminal feeds back the signal indicating that the channel is allowed to be occupied.

The channel occupation request signal may also include pilot information for channel quality measurement.

After correctly receiving the channel occupation request signal based on a beam, the terminal feeds back one signal indicating that the channel is allowed to be occupied for the channel occupation request signal of the beam. This signal indicating that the channel is allowed to be occupied can occupy one orthogonal frequency division multiplex (OFDM) symbol. In addition to information related to the channel occupation time, the signal indicating that the channel is allowed to be occupied may also include the ID information of the beam, the UEID information, and the beam-based CQI information, such as an estimated value of received signal strength indication (RSSI) and/or an estimated value of reference signal received power (RSRP)/reference signal received quality (RSRQ).

In fact, the beam-based CQI information is very important for the base station to determine whether there are hidden nodes on the beam. The beam-based CQI can be carried in uplink control information (UCI). An example for measuring a pilot frequency used by the beam-based CQI may be based on a demodulation reference signal (DMRS) included in a channel state information reference signal (CSI-RS) or a synchronization signal block (SSB).

Before receiving the signal indicating that the channel is allowed to be occupied, the base station does not know whether the channel can be accessed or not, so that at least before the base station receives the signal indicating that the channel is allowed to be occupied, the base station sends, on a plurality of beams on which the LBT passes, the channel occupation request signal. Of course, it does not rule out the special case that the base station only sends, on one optimal beam, the channel occupation request signal.

When the terminal receives the signal, the terminal can use a plurality of beams to receive the channel occupation request signal, and feeds back the signal indicating that the channel is allowed to be occupied after successfully decoding the signal. After successfully receiving the signal indicating that the channel is allowed to be occupied, the base station determines that the channel can be accessed to transmit data.

If the terminal correctly decodes, on a plurality of beams, the channel occupation request signal, the terminal may feedback the signal indicating that the channel is allowed to be occupied on all the beams, or may feedback the signal indicating that the channel is allowed to be occupied to several beams which are selected by the terminal according to a configuration of the base station.

The base station determines, according to signals indicating that channels are allowed to be occupied, which are fed back by a plurality of sets of UE, beams which access the channels. For example, a beam with most multiplexing users or largest transmission capacity can be selected to access the channel to transmit data. Of course, there is no choice if there is only one beam.

In specific implementation, the fairness of scheduling can also be considered. The selection is made based on handshaking success information on each beam or with reference to data scheduling-related information of a user, such as the number of scheduling, the volume of data to be transmitted and the capability of the UE.

Embodiment 2

In the embodiments, when the base station receives, on a plurality of beams, the signal indicating that the channel is allowed to be occupied, the base station schedules a user having a successful handshake between the channel occupation request signal and the signal indicating that the channel is allowed to be occupied to transmit data; and/or, when the base station receives, on a plurality of beams, the signal indicating that the channel is allowed to be occupied, the base station transmits data, on a beam on which a ratio of the number of users sending the signal indicating that the channel is allowed to be occupied to the number of users receiving the channel occupation request signal is greater than a preset value.

During implementation, the data is transmitted on an LBT time-superior beam which is selected from the beams on which the ratio of the number of users sending the signal indicating that the channel is allowed to be occupied to the number of users receiving the channel occupation request signal is greater than the preset value.

In one embodiment, the base station often intends to schedule a plurality of terminals at one time; the base station may send, on the beam on which the LBT operation is successful, to the plurality of terminals the channel occupation request signal, but users successfully receiving the channel occupation signal are likely to belong to one sub-set of users to which the base station sends the signal for requesting the channel occupation. After receiving the signal indicating that the channel is allowed to be occupied, the base station accesses the channel, and only schedules a user having a successful handshake between the signal for requesting the occupation and the signal indicating that the occupation is allowed to transmit uplink or downlink data. In consideration of a plurality of users that feedback the signal indicating that the channel is allowed to be used, another alternative operation method of the base station is to set a threshold. If a ratio of the number of UE receiving, on this beam, the signal indicating that the occupation is allowed to the number of UE to which the base station sends the signal for requesting the occupation is less than a threshold, the base station is not allowed to access the channel on this beam. For example, the threshold may be set to be 20%.

If the base station sends, on a plurality of beams, the channel occupation request signal, and if the terminal correctly decodes, on the plurality of beams, the channel occupation request signal, the terminal may feedback the signal indicating that the channel is allowed to be occupied to all the beams, or may feedback, according to a configuration of the base station, the signal indicating that the channel is allowed to be occupied to several beams which are selected. The base station determines, according to signals fed back by the plurality of sets of UE and indicating that the channels are allowed to be occupied, beams which access the channels. The beam with most multiplexing users or largest transmission capacity may be selected to access the channel to transmit data. The other method is to use the LBT time-superior beam, on which a ratio of the number of the signals received on the above-mentioned beam and indicating that the occupation is allowed to the number of the set signals requesting the occupation is less than the threshold, to access the channel preferentially.

Embodiment 3

As mentioned in the example of Embodiment 1, a relatively good effect can be achieved under the condition of guaranteeing the consistency of the sending and receiving beams of the equipment. However, if the receiving beam that performs the LBT and the beam that sends the signal are not calibrated, and cannot be kept as the same beam, it doesn't make much sense to perform the LBT operation in the direction corresponding to the beam that sends the signal, and the base station may not perform the LBT operation in the direction corresponding to each beam, but directly sends the channel occupation request signal in a direction corresponding to an allowable beam. At this time, other actions of the terminal and the base station may be consistent with those in Embodiment 1.

Embodiment 4

In the embodiments on the base station side: the beam on which the LBT operation is performed is determined according to prior information of the channel.

The prior information is transmission performance information indicating whether an SSB may be correctly transmitted, or transmission performance information, acquired in the SSB transmission process, of the beam.

In one embodiment, as mentioned in Embodiment 1, there are a plurality of beams on which the base station sends the channel occupation request signal. The base station can perform the LBT operation in directions corresponding to all possible beams. However, this requires relatively high complexity. Therefore, the base station may determine, according to the prior information, a set of beams on which the LBT can be performed. One determination method is to rely on the prior information of the channel, for example, the base station may take beams that can correctly transmit the SSB as a beam set on which the LBT needs to be performed; or, the base station may take an optimal beam determined in an SSB transmission process as a beam on which the LBT will be performed.

Embodiment 5

In the embodiments, on the base station side: the performing for the LBT operation includes one of the following modes or a combination of the following modes:

continuously performing, in a direction corresponding to a beam, the LBT operation until the LBT operation is successful; or, performing the LBT operation in a direction corresponding to a beam within a preset time period, and if the LBT is not successful, performing the LBT operation in a direction corresponding to other beam; or, performing the LBT operation in a direction corresponding to each of beams by means of sequential time division of beam scanning.

The modes further include: after receiving the signal indicating that the channel is allowed to be occupied, the base station stops performing the LBT operation or continuing to perform the LBT operation.

In one embodiment, modes for performing the LBT operation in the direction corresponding to the beam may be as follows.

The first mode is to continuously perform, in a direction corresponding to a beam, the LBT operation until the LBT operation is successful; the base station maintains one counter, and performs the LBT operation in a direction corresponding to one beam until the LBT operation is successful; that is, in this mode, the base station maintains one counter, and may perform the LBT operation all the time in a direction corresponding to one beam until the LBT operation is successful.

The second mode is to perform the LBT operation in a direction corresponding to a beam, and perform the LBT operations in a direction corresponding to other beam if the above performing time is beyond a threshold; the base station maintains one counter, and performs the LBT operation in a direction corresponding to one beam until the operation is performed beyond a preset time period; if the LBT is not successful, the base station resets a value of the one counter, and perform the LBT operation in a direction corresponding to other beam. That is, in this mode, the base station maintains one counter, and resets the value of the counter if it does not access the channel after performing the LBT operation in the direction corresponding to one beam for time beyond a first threshold.

The third mode is to perform the LBT operation in a direction corresponding to each beam by means of sequential time division of beam scanning. Time granularity of scanning is configurable. For example, it may be an integral multiple of a clear channel assessment (CCA) slot or an integral multiple of an OFDM symbol. The base station performs the LBT operation in the direction corresponding to each beam, and then sends, on the beam on which the LBT operation is acquired successfully, the channel occupation request signal.

The base station maintains a plurality of counters, and performs the LBT operation in a direction corresponding to one beam until the operation is performed beyond the preset time period; if the LBT is not successful, the base station switches to other counter of the plurality of counters other than one counter, corresponding to the one beam, of the plurality of counters, performs the LBT operation in a direction corresponding to other beam, and retains values of the plurality of counters; or, the base station maintains a plurality of counters, and performs the LBT operation in a direction corresponding to one beam until the operation is performed beyond the preset time period; if the LBT is not successful, the base station switches to other counter of the plurality of counters other than one counter, corresponding to the one beam, of the plurality of counters, performs the LBT operation in a direction corresponding to other beam, retains the values of the plurality of counters, and resets the values after the number of the performing for the LBT operation beyond the preset time period is greater than a preset value.

That is, in this mode, the base station maintains the plurality of counters, and switches to other counter if the channel is not accessed after the performing for the LBT operation in the direction corresponding to one beam for time beyond a first threshold, and then the value of the original counter is kept. Or, the value is reset only after the LBT operation is performed for time beyond a second threshold.

The fourth mode is that the base station maintains a plurality of counters, and performs the LBT operation in a direction corresponding to each beam by means of sequential time division of beam scanning, and the time granularity of scanning is configurable.

That is, in this mode, the base station maintains the plurality of counters, and performs the LBT operation in a direction corresponding to each beam by means of sequential time division of beam scanning. The time granularity of scanning is configurable. For example, it may be an integral multiple of a CCA slot or an integral multiple of an OFDM symbol. The base station performs the LBT operation in the direction corresponding to each beam, and then maintains, according to a result of the LBT operation, the plurality of counters.

Once the signal indicating that the channel is allowed to be occupied, which is sent by the terminal, is successfully received by the base station, the base station may give up continuing to perform the LBT operation in directions corresponding to other beams, or may continue to perform the LBT operation in directions corresponding to other beams. This depends on the requirement of realization.

Embodiment 6

In the embodiments, on the base station side: the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network.

Correspondingly, on the terminal side: the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network.

In one embodiment, the signal indicating that the channel is allowed to be occupied is fed back according to interlace information indicated by the base station.

In one embodiment, after receiving the channel occupation request signal, the terminal needs to feed back to the base station the signal indicating that the channel is allowed to be occupied.

Uplink transmission of the unlicensed spectrum requires that a transmission power needs to occupy 80% or more of the bandwidth of the channel, so that licensed assisted access (LAA) adopts an interlace structure, that is, a plurality of physical resource blocks (PRBs) are uniformly distributed in a frequency domain as an interlace. For example, a full bandwidth includes 100 PRBs, and one PRB is occupied every other 10 PRBs to obtain one interlace. The full bandwidth supports 10 interlaces, and supports 10 users at most. Therefore, the base station can configure, for the UE, the interlace information of transmission of feeding back the signal indicating that the channel is allowed to be occupied, that is, the sent channel occupation request signal may include the interlace information, which is distributed to the UE, of the transmission of feeding back the signal indicating that the channel is allowed to be occupied, such as an interlace index. Instructions in this way require a certain amount of overhead.

Another possible method is that the network semi-statically configures an available interlace set for the UE, and the terminal freely selects the interlace for sending. At this time, the UEID information can be included in the signal indicating that the channel is allowed to be occupied.

Embodiment 7

In the embodiments, on the base station side: the signal indicating that the channel is allowed to be occupied is fed back by means of time information configured for the terminal by the base station; or, the signal indicating that the channel is allowed to be occupied is fed back by each terminal at the same time.

The method further includes: the base station configuring for the terminal an LBT parameter required to be used to feed back the signal indicating that the channel is allowed to be occupied.

When an LBT type in the LBT parameter is LBT cat.4, the LBT parameter includes the size of a counter or size information of a contention window used for producing the counter.

Correspondingly, on the terminal side: the signal indicating that the channel is allowed to be occupied is fed back by means of time information configured for the terminal by the base station.

The method further includes: receiving an LBT parameter which is configured for the terminal by the base station and required to be used to feed back the signal indicating that the channel is allowed to be occupied;
after performing, according to the LBT parameter, the LBT operation in a direction corresponding to the beam on which the signal is received, feeding back to the base station the signal indicating that the channel is allowed to be occupied.

When the LBT type in the LBT parameter is LBT cat.4, the LBT operation is performed according to the size, included in the LBT parameter, of a counter or size information, included in the LBT parameter, of a contention window used for producing the counter.

In one embodiment, a frequency domain transmission solution in which a plurality of scheduled users send signals indicating that channels are allowed to be occupied is provided in Embodiment 5. For the time when the plurality of scheduled users send the signals indicating that the channels are allowed to be occupied, the following solutions can be used: the plurality of scheduled users transmit the signals indicating that the channels are allowed to be occupied at the same time; the base station can configure, for the terminal, LBT parameters required to be used by the UE to send the signal indicating that the channels are allowed to be occupied, and then the channel occupation request signal or an uplink scheduling signaling of the base station includes LBT parameters required to be used by the UE to send the signals indicating that the channels are allowed to be occupied. If the LBT type is LBT cat.4, the size of the counter or the size information of the contention window for producing the counter may also be provided.

Another solution is to transmit the signals indicating that the channels are allowed to be occupied in a time division manner. For example, different terminals transmit, on different OFDM symbols, the signals indicating that the channels are allowed to be occupied. In this case, the base station can configure, for the terminal, the time information used for feeding back the signal indicating that the channel is allowed to be occupied. Then, the channel occupation request signal, or the uplink scheduling signaling of the base station, includes the time information used for feeding back the signal indicating that the channel is allowed to be occupied.

Embodiment 8

In the embodiments, within one time unit, sending on a plurality of beams is generally implemented in one beam direction only, so that the base station can send, on at least one beam, to the terminal the channel occupation request signal in sequence.

During implementation, for the performing for the LBT operation in a plurality of beam directions, when the channel occupation request signal is sent, a beam direction in which the channel occupation request signal is allowed to be sent should be determined first. An example of a determination method is, for example, a carrier that is the first to successfully perform the LBT operation. At this time, not all the foregoing beam directions are at the LBT stage, but the LBT operation has been successful in some beam directions, and failed in other beam directions. The base station sends, in the previously determined beam directions, the channel occupation request signal. If the handshaking time of the channel occupation request signal/signal indicating that the channel is allowed to be occupied is not obviously longer than the time of scanning a next beam, and the LBT operation is performed first in other beam directions at this time, it will cause a failure in transmitting-receiving switching (it takes time for Tx/Rx radio frequency switching) and result in receiving, in the beam direction in which the channel occupation request signal is sent, the signal indicating that the channel is allowed to be occupied. However, if the foregoing time is long enough, the base station can be allowed to perform the LBT operation first in other beam directions, and then goes back to the original beam direction in which the channel occupation request signal is sent to receive, within a corresponding time window, the signal indicating that the channel is allowed to be occupied. Therefore, there are two solutions allowing the LBT operations on multiple beams.

Therefore, there are at least two solutions allowing the LBT operation in directions corresponding to a plurality of beams.

Solution I: after sending, on a beam, to the terminal the channel occupation request signal, the base station waits, on this beam, to receive the signal indicating that the channel is allowed to be occupied, that is, after sending the channel occupation request signal completely, the base station waits, in this beam direction, to receive the signal indicating that the channel is allowed to be occupied.

Solution II: after sending, on a beam, to the terminal the channel occupation request signal, the base station continues to send, on a next beam, to the terminal a channel occupation request signal, and receives, on the beam sending the channel occupation request signal, a corresponding signal indicating that a channel is allowed to be occupied, that is, after sending the channel occupation request signal completely, the base station continues to perform scanning on other beams.

Of course, when only one direction corresponds to the beam on which the LBT operation is performed, only Solution I is available.

Embodiment 9

In the embodiments, on the base station side: the channel occupation request signal is sent by using subcarriers of 60 K and more than 60 K.

Correspondingly, on the terminal side: the channel occupation request signal is sent by using subcarriers of 60 K and more than 60 K.

In specific implementation, a gap between handshaking signals of the signal for requesting channel occupation and the signal indicating that the channel is allowed to be occupied is an integral multiple of the OFDM symbol.

During implementation, when the channel occupation request signal is sent by using a subcarrier of 60 K, the gap between the signal for requesting the channel occupation and the signal indicating that the channel is allowed to be occupied is 1 OFDM symbol; or, when the channel occupation request signal is sent by using a subcarrier of 120 K, the gap between the signal for requesting the channel occupation and the signal indicating that the channel is allowed to be occupied is 2-3 OFDM symbols; or, when the channel occupation request signal is sent by using a subcarrier of 240K, the gap between the signal for requesting the channel occupation and the signal indicating that the channel is allowed to be occupied is 4-6 OFDM symbols; or, when the channel occupation request signal is sent by using a subcarrier of 480K, the gap between the signal for requesting the channel occupation and the signal indicating that the channel is allowed to be occupied is 8-12 OFDM symbols.

During implementation, a value of the gap is informed by the base station to the terminal by means of signaling, or is pre-determined by the network and the terminal.

In one embodiment, after sending the channel occupation request signal, the base station does not confirm that the channel occupation right is acquired. To prevent the channel from being preempted by other systems, the terminal may not use the LBT operation, but directly send the signal indicating that the channel is allowed to be occupied. The ETSI stipulates that a short control signaling may not sense the channel. If a gap between an RTS frame and a CTS frame of WiFi is 16 us, the CTS may not listen the channel. NR supports flexible numerology, In one embodiment shown in the following table.

| Subcarrier spacing | 15K | 30K | 60K | 120K | 240K | 480K |
|---|---|---|---|---|---|---|
| OFDM symbol length | 66.67 us | 33.3 us | 16.67 us | 8.33 us | 4.17 us | 2.08 us |
| Cyclic prefix | 4.8 us | 2.4 us | 1.2 us | 0.6 us | 0.3 us | 0.15 us |

Therefore, in order to make sure that the signal indicating that the channel is allowed to be occupied does not need to perform the LBT operation, the channel occupation request signal/signal indicating that the channel is allowed to be occupied may be sent by using the subcarriers of 60 K and more than 60 K. Data sending subcarriers may adopt corresponding subcarrier sizes as required according to adopted spectrums. In the case that the subcarrier spacing is more than or equal to 60 K, in order to prevent the signal indicating that the channel is allowed to be occupied from performing the LBT operation and reserve time for the terminal to decode the channel occupation request signal, for the subcarrier spacing of 60 K, the gap between the signal for requesting the channel occupation and the signal indicating that the channel is allowed to be occupied is 1 OFDM symbol; for the subcarrier spacing of 120 K, the gap between the signal for requesting the channel occupation and the signal indicating that the channel is allowed to be occupied is 2-3 OFDM symbols; for the subcarrier spacing of 240 K, the gap between the signal for requesting the channel occupation and the signal indicating that the channel is allowed to be occupied is 4-6 OFDM symbols; and for the subcarrier spacing of 480 K, the gap between the signal for requesting the channel occupation and the signal indicating that the channel is allowed to be occupied is 8-12 OFDM symbols.

Based on the same disclosure concept, the embodiments of the present application further provide a base station, a terminal, a data transmission device and a signal feedback device. Since the principles of these sets of equipment for solving the problems are similar to those of the data transmission method and the signal feedback method, implementations of these sets of equipment may refer to the implementations of the methods, and no more repeated details will be described.

The embodiments of the present application may be implemented by the following mode.

Figure 9:
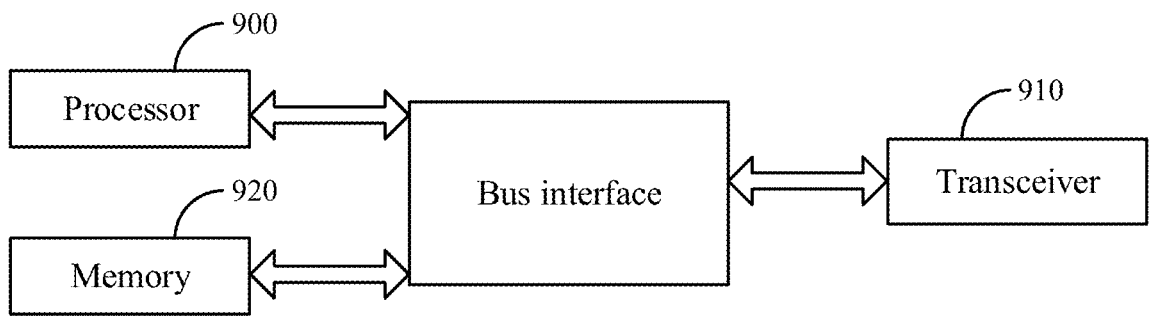
FIG. 9 is a structural schematic diagram of a base station in embodiments of the present application.

FIG. 9 is a structural schematic diagram of a base station. As shown in FIG. 9, the base station includes:

a processor 900, configured to read a program in a memory 920 and to process data according to a requirement of a transceiver;

the transceiver 910, configured to receive and transmit data under the control of the processor 900 and configured to:

send a channel occupation request signal to request channel occupation to a terminal, after the base station performs LBT operation in a direction corresponding to at least one beam, and transmit data on a beam sending the channel occupation request signal, after the base station receives a signal indicating that a channel is allowed to be occupied.

During implementation, after sending, on the beam, to the terminal the channel occupation request signal, the base station waits, on the beam, to receive the signal indicating that a channel is allowed to be occupied; and/or, after sending, on the beam, to the terminal the channel occupation request signal, the base station continues to send, on a next beam, to the terminal a channel occupation request signal, and receives, on the beam sending the channel occupation request signal, a corresponding signal indicating that a channel is allowed to be occupied.

During implementation, the beam sending the channel occupation request signal refers to all or part of beams on which channels are detected to be idle after the LBT operation is performed according to time order in the direction corresponding to the at least one beam.

During implementation, the beam on which the LBT operation is performed refers to all possible beams in a space, and/or, refers to part of possible beams determined and configured in a network in advance.

During implementation, the beam on which the LBT operation is performed is determined according to prior information.

During implementation, the prior information is transmission performance information indicating whether an SSB may be correctly transmitted, or transmission performance information acquired in an SSB transmission process.

During implementation, the performing for the LBT operation includes one of the following modes or a combination of the following modes:

continuously performing, in a direction corresponding to a beam, the LBT operation until the LBT operation is successful; or, performing the LBT operation in a direction corresponding to a beam within a preset time period, and if the LBT is not successful, performing the LBT operation in a direction corresponding to other beam; or, performing the LBT operation in a direction corresponding to each beam by means of sequential time division of beam scanning.

During implementation, the performing for the LBT operation includes one of the following modes or a combination of the following modes:

maintaining, by the base station, one counter; and performing, by the base station, the LBT operation in a direction corresponding to one beam until the LBT operation is successful; or, maintaining, by the base station, one counter;

performing, by the base station, the LBT operation in a direction corresponding to one beam until the operation is performing beyond a preset time period; and if the LBT is not successful resetting, by the base station, a value of the one counter, and performing, by the base station, the LBT operation in a direction corresponding to other beam; or, maintaining, by the base station, a plurality of counters; performing, by the base station, the LBT operation in a direction corresponding to one beam until the operation is performed beyond the preset time period; and if the LBT is not successful, switching, by the base station, to other counter of the plurality of counters other than one counter, corresponding to the one beam, of the plurality of counters, performing, by the base station, the LBT operation in a direction corresponding to other beam, and retaining, by the base station, values of the plurality of counters; or, maintaining, by the base station, a plurality of counters; performing, by the base station, the LBT operation in a direction corresponding to one beam until the operation is performed beyond the preset time period; and if the LBT is not successful, switching, by the base station, to other counter of the plurality of counters other than one counter, corresponding to the one beam, of the plurality of counters, performing, by the base station, the LBT operation in a direction corresponding to other beam, retaining, by the base station, values of the plurality of counters, and resetting, by the base station, values of the plurality of counters after a number of times of the performing for the LBT operation beyond the preset time period is greater than a preset value; or, maintaining, by the base station, a plurality of counters; and performing, by the base station, the LBT operation in a direction corresponding to each of beams by means of sequential time division of scanning for the beams; and time granularity of scanning is configurable.

During implementation, the time granularity of scanning is an integral multiple of a CCA slot or an integral multiple of an OFDM symbol.

During implementation, the base station stops performing the LBT operation or continuing to perform the LBT operation, after the base station receives the signal indicating that the channel is allowed to be occupied.

During implementation, the channel occupation request signal includes one of the following information or a combination of the following information:

information of a scheduled user equipment identity (UEID), a beam ID of the beam sending the channel occupation request signal, position information, in the space, of the beam sending the channel occupation request signal, channel occupation time information of the beam sending the channel occupation request signal, a resource configuration required when the terminal feeds back the signal indicating that the channel is allowed to be occupied, LBT type information required when the terminal feeds back the signal indicating that a channel is allowed to be occupied, or pilot frequency information used for measuring channel quality.

During implementation, the signal indicating that a channel is allowed to be occupied is fed back by means of interlace information dynamically indicated by the base station; and/or, the signal indicating that the channel is allowed to be occupied is fed back by means of interlace information semi-statically configured for the terminal by a network.

During implementation, the signal indicating that the channel is allowed to be occupied is fed back according to interlace information indicated by the base station.

During implementation, the signal indicating that the channel is allowed to be occupied is fed back by means of time information configured for the terminal by the base station; or, the signal indicating that the channel is allowed to be occupied is fed back by each terminal at the same time.

During implementation, the base station configures for the terminal an LBT parameter required to be used to feed back the signal indicating that the channel is allowed to be occupied.

During implementation, when an LBT type in the LBT parameter is LBT cat.4, the LBT parameter includes the size of a counter or size information of a contention window used for producing the counter.

During implementation, the base station transmits the data on a beam with most multiplexing users or a beam with largest transmission capacity, in the condition that the base station receives, on a plurality of beams, the signal indicating that the channel is allowed to be occupied.

During implementation, when the base station receives, on a plurality of beams, the signal indicating that the channel is allowed to be occupied, the base station schedules a user having a successful handshake between the channel occupation request signal and the signal indicating that the channel is allowed to be occupied to transmit data; and/or, when the base station receives, on a plurality of beams, the signal indicating that the channel is allowed to be occupied, the base station transmits data on a beam on which a ratio of the number of users sending the signal indicating that the channel is allowed to be occupied to the number of users receiving the channel occupation request signal is greater than a preset value.

During implementation, the data is transmitted on an LBT time-superior beam which is selected from the beams on which the ratio of the number of users sending the signal indicating that the channel is allowed to be occupied to the number of users receiving the channel occupation request signal is greater than the preset value.

During implementation, the channel occupation request signal is sent by using subcarriers of 60 K and more than 60 K.

During implementation, a gap between handshaking signals of the channel occupation request signal and the signal indicating that the channel is allowed to be occupied is an integral multiple of an OFDM symbol.

During implementation, the gap between the channel occupation request signal and the signal indicating that the channel is allowed to be occupied is 1 OFDM symbol, in the condition that the channel occupation request signal is sent by using a subcarrier of 60 K; or, the gap between the channel occupation request signal and the signal indicating that the channel is allowed to be occupied is 2-3 OFDM symbols, in the condition that the channel occupation request signal is sent by using a subcarrier of 120 K; or, the gap between the channel occupation request signal and the signal indicating that the channel is allowed to be occupied is 4-6 OFDM symbols, in the condition that the channel occupation request signal is sent by using a subcarrier of 240 K; or, the gap between the channel occupation request signal and the signal indicating that the channel is allowed to be occupied is 8-12 OFDM symbols, in the condition that the channel occupation request signal is sent by using a subcarrier of 480 K.

During implementation, a value of the gap is informed by the base station to the terminal by means of signaling, or is pre-determined by the network and the terminal.

During implementation, when a beam correspondence cannot be guaranteed, LBT cat.1 is used to perform the LBT operation.

In FIG. 9, a bus architecture may include any number of interconnected buses and bridges, and is particularly formed by linking one or more of processors represented by the processor 900 and the various circuits of memories represented by the memory 920 together. The bus architecture may also link various other circuits such as peripherals, voltage regulators and power management circuits, which are well known in the art and, therefore, are not further described herein. A bus interface provides an interface. The transceiver 910 may be a plurality of elements, namely including a transmitter and a transceiver and providing units that communicate with various other apparatuses on a transmission medium. The processor 900 is responsible for managing the bus architecture and performing usual processing, and the memory 920 may store data used when the processor 900 performs operations.

Figure 10:
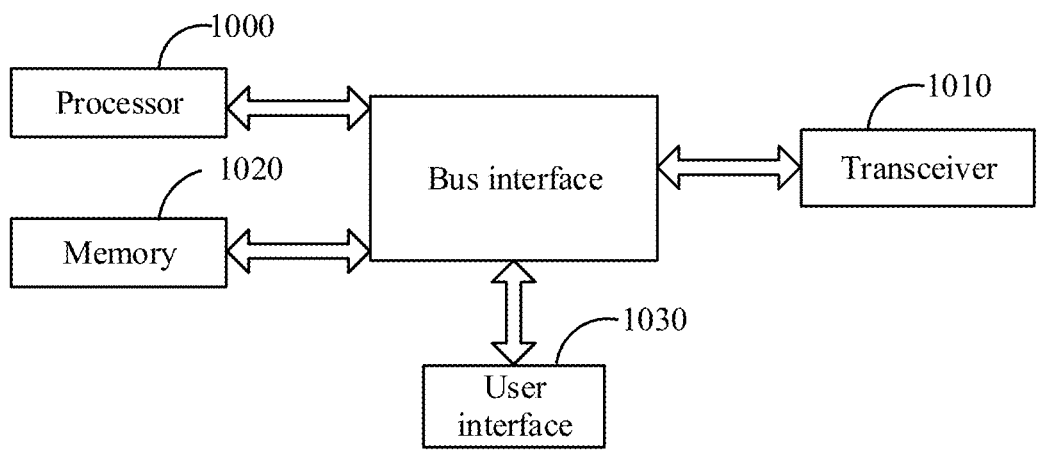
FIG. 10 is a structural schematic diagram of UE in embodiments of the present application.

FIG. 10 is a structural schematic diagram of user equipment (UE). As shown in FIG. 10, the UE includes:

a processor 1000, configured to read a program in a memory 1020 and process data according to a requirement of a transceiver;

the transceiver 1010, configured to receive and transmit data under the control of the processor 1000, and configured to:

receive a channel occupation request signal sent to the terminal by a base station on at least one beam, and the channel occupation request signal is a signal for requesting channel occupation; and feedback, a signal indicating that the channel is allowed to be occupied on a beam on which the channel occupation request signal is received, to the base station, after the terminal receives the channel occupation request signal correctly.

During implementation, the signal indicating that the channel is allowed to be occupied includes one of the following information or a combination of the following information: information related to channel occupation time, ID information of the beam, UEID information of the terminal, beam-based CQI information.

During implementation, the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network.

During implementation, the signal indicating that the channel is allowed to be occupied is fed back according to interlace information indicated by the base station.

During implementation, the signal indicating that the channel is allowed to be occupied is fed back by means of time information configured for the terminal by the base station.

During implementation, the terminal receives a listen before talk (LBT) parameter which is configured for the terminal by the base station and required to be used to feed back the signal indicating that the channel is allowed to be occupied; the terminal feeds back the signal indicating that the channel is allowed to be occupied to the base station, after an LBT operation is performed in a direction, corresponding to the beam on which the signal is received, according to the LBT parameter.

During implementation, when an LBT type in the LBT parameter is LBT cat.4, the LBT operation is performed according to the size, included in the LBT parameter, of a counter or size information, included in the LBT parameter, of a contention window used for producing the counter.

During implementation, the channel occupation request signal is sent by using subcarriers of 60 K and more than 60 K.

During implementation, a gap between handshaking signals of the signal for requesting the channel occupation and the signal indicating that the channel is allowed to be occupied is an integral multiple of an OFDM symbol.

During implementation, the gap between the signal for requesting the channel occupation and the signal indicating that the channel is allowed to be occupied is 1 OFDM symbol, in the condition that the channel occupation request signal is sent by using a subcarrier of 60 K; or, the gap between the signal for requesting the channel occupation and the signal indicating that the channel is allowed to be occupied is 2-3 OFDM symbols in the condition that the channel occupation request signal is sent by using a subcarrier of 120 K; or, the gap between the signal for requesting the channel occupation and the signal indicating that the channel is allowed to be occupied is 4-6 OFDM symbols, in the condition that the channel occupation request signal is sent by using a subcarrier of 240 K; or, the gap between the signal for requesting the channel occupation and the signal indicating that the channel is allowed to be occupied is 8-12 OFDM symbols, in the condition that the channel occupation request signal is sent by using a subcarrier of 480 K.

During implementation, a value of the gap is informed by the base station to the terminal by means of signaling, or is pre-determined by the network and the terminal.

In FIG. 10, a bus architecture may include any number of interconnected buses and bridges, and is particularly formed by linking one or more of processors represented by the processor 1000 and the various circuits of memories represented by the memory 1020 together. The bus architecture may also link various other circuits such as peripherals, voltage regulators and power management circuits, which are well known in the art, and therefore, are not further described herein. A bus interface provides an interface. The transceiver 1010 may be a plurality of elements, namely including a transmitter and a receiver and providing units that communicate with various other apparatuses on a transmission medium. For different UE, a user interface 1030 may be an interface capable of externally and internally connecting desired devices, and the connected devices include, but not limited to, a keypad, a display, a speaker, a microphone, a joystick, and the like.

The processor 1000 is responsible for managing the bus architecture and performing usual processing, and the memory 1020 may store data used when the processor 1000 performs operations.

The processor may be a general-purpose processor, a digital signal processor, an application specific integrated circuit, a field programmable gate array or other programmable logic device, a discrete gate or transistor logic device, and a discrete hardware component, and may implement or perform the various methods, steps and logic block diagrams disclosed in the embodiments of the present application. The general-purpose processor may be a microprocessor or any conventional processor. The steps of the method disclosed in conjunction with the embodiment of the present application may be directly embodied as being performed by a hardware processor, or may be performed and completed by a combination of hardware and software modules in the processor.

The software module may be located in a mature storage medium in the art, such as a random access memory, a flash memory, a read-only memory, a programmable read-only memory, an electrically erasable programmable memory, and a register.

An embodiment of the present application further provides a data transmission device, including:

a sending device, configured to send to a terminal a channel occupation request signal to request channel occupation after an LBT operation is performed in a direction corresponding to at least one beam; and a transmission device, configured to transmit data on the beam sending the channel occupation request signal after a signal indicating that a channel is allowed to be occupied is received.

The specific implementation may refer to the implementation of a data transmission method.

An embodiments of the present application further provides a signal feedback device, including:

a receiving device, configured to receive a channel occupation request signal sent to a terminal by a base station on at least one beam, and the channel occupation request signal is a signal for requesting channel occupation; and a feedback device, configured to feedback, on the beam on which the signal is received, to the base station the signal indicating that the channel is allowed to be occupied after the channel occupation request signal is correctly received.

The specific implementation may refer to the implementation of a signal feedback method.

For convenience of description, the various parts of the above described devices are described in terms of functions divided into various modules or units. Of course, the functions of the various modules or units may be implemented in one or more software or hardware during implementation of the present application.

Based on the same disclosure concept, an embodiment of the present disclosure further provides a computer readable storage medium storing a computer instruction. When the computer instruction is operated on a computer, the computer implements the foregoing methods in the embodiments of the present application.

During implementation, the readable storage medium may be a computer storage medium, and the computer storage medium may be any available media or data storage devices accessible by a computer, including, but not limited to, a magnetic memory (e.g., a floppy disk, a hard disk, a magnetic tape, a magneto-optical disk (MO), etc.), an optical memory (e.g., a CD, a DVD, a BD, an HVD, etc.), a semiconductor memory (e.g., a read-only memory (ROM), an electrically programmable ROM (EPROM), an electrically erasable programmable ROM (EEPROM), a non-volatile memory (NAND FLASH), a solid-state hard disk (SSD)), and the like.

The UE in the embodiment of the present application refers to a device for providing speech and/or data connectivity, a handheld device having a wireless connection function, or other processing devices connected to a wireless modem. Wireless UE can communicate with one or more core networks through a radio access network (RAN). The wireless UE can be a mobile terminal, such as a mobile phone (or "cellular" phone) and a computer with a mobile terminal. The wireless UE, for example, may be a portable, pocket-sized, handheld, computer built-in or vehicle-mounted mobile device, which exchanges language and/or data with a wireless access network, such as a personal communication service (PCS) phone, a cordless telephone, a session initiation protocol (SIP) phone, a wireless local loop (WLL) station, and a personal digital assistant (PDA). The wireless UE may also be called a system, a subscriber unit, a subscriber station, a mobile station, a mobile, a remote station, an access point, a remote terminal, an access terminal, a user terminal, a user agent and a user device.

The base station in the embodiments of the present application may be configured to mutually convert a received air frame and an Internet protocol (IP) packet, and used as a router between the wireless UE and other portions of an access network. The other portions of the access network may include an IP network device. The base station may further coordinate the attribute management of an air interface. For example, the base station can be a network device in a 5G system, such as a next generation Node B (gNB), or a base transceiver station (BTS) in a global system for mobile communication (GSM) or code division multiple access (CDMA). The base station may also be a base station (NodeB) in wideband code division multiple access (WCDMA), or an evolutional Node B (eNB or e-NodeB) in LTE. The embodiments of the present application do not limit the base station.

Embodiments of the present application may be methods, systems or computer program products. Therefore, the present application may adopt the form of a complete hardware embodiment, a complete software embodiment, or a software and hardware combined embodiment. In addition, the present application may adopt the form of a computer program product implemented on one or multiple computer-sensitive storage media (including, but not limited to, a magnetic disk memory, a compact disc read-only memory (CD-ROM), an optical memory and the like) including computer-sensitive program codes.

The present application is described by referring to flowcharts and/or block diagrams of methods, devices (systems) and computer program products according to the embodiments of the present application. It should be understood that computer program instructions may implement each flow and/or each block in the flowcharts and/or the block diagrams and combination of the flows and/or the blocks in the flow diagrams and/or the block diagrams. These computer program instructions may be provided for a general computer, a dedicated computer, an embedded processor or processing units of other programmable data processing devices to produce a machine, making the instructions that are performed by the computer or the processing units of other programmable data processing devices produce apparatuses for realizing specified functions in one or multiple flows of the flow diagrams and/or one or multiple blocks of the block diagrams.

These computer program instructions also may be stored in a computer readable memory capable of guiding the computer or other programmable data processing devices to work in a specific manner, making the instructions that are stored in the computer readable memory produce manufactured products that include instruction apparatuses. The instruction apparatuses realize the specified functions in one or multiple flows of the flow diagrams and/or one or multiple blocks of the block diagrams.

These computer program instructions also may be loaded onto the computer or other programmable data processing devices to perform a series of operation steps on the computer or other programmable data processing devices to generate processing implemented by the computer, so that the instructions performed on the computer or other programmable data processing devices provide steps for realizing the specified functions in one or multiple flows of the flow diagrams and/or one or multiple blocks of the block diagrams.

What is claimed is:

1. A data transmission method, comprising:
sending, by a base station, a channel occupation request signal to request channel occupation to a terminal, after the base station performs a listen before talk (LBT) operation in a direction corresponding to at least one beam; and
transmitting, by the base station, data on a beam sending the channel occupation request signal, after the base station receives a signal indicating that a channel is allowed to be occupied;
wherein LBT cat.1 is used to perform the LBT operation, in the condition that a beam correspondence is not be guaranteed.

2. The method according to claim 1, wherein the beam sending the channel occupation request signal refers to all or part of beams on which channels are detected to be idle after the base station performs, according to a time order, the LBT operation in the direction corresponding to the at least one beam.

3. The method according to claim 2, wherein a beam on which the LBT operation is performed is at least one beam in a space, and/or, at least one beam determined and configured by a network in advance; or,
a beam on which the LBT operation is performed is determined according to prior information.

4. The method according to claim 1, wherein the performing for the LBT operation comprises one of the following modes or a combination of the following modes:
continuously performing, in a direction corresponding to a certain beam, the LBT operation until the LBT operation is successful; or,
performing the LBT operation in a direction corresponding to a certain beam within a preset time period, and if the LBT operation is not successful, performing the LBT operation in a direction corresponding to other beam; or,
performing the LBT operation in a direction corresponding to each of beams by means of sequential time division of scanning for beams.

5. The method according to claim 4, wherein the performing for the LBT operation comprises one of the following modes or a combination of the following modes:
maintaining, by the base station, one counter; and performing, by the base station, the LBT operation in a direction corresponding to one beam until the LBT operation is successful; or,
maintaining, by the base station, one counter; performing, by the base station, the LBT operation in a direction corresponding to one beam until the operation is performing beyond a preset time period; and if the LBT is not successful, resetting, by the base station, a value of the one counter, and performing, by the base station, the LBT operation in a direction corresponding to other beam; or,
maintaining, by the base station, a plurality of counters; performing, by the base station, the LBT operation in a direction corresponding to one beam until the operation is performed beyond the preset time period; and if the LBT is not successful, switching, by the base station, to other counter of the plurality of counters other than one counter, corresponding to the one beam, of the plurality of counters, performing, by the base station, the LBT operation in a direction corresponding to other beam, and retaining, by the base station, values of the plurality of counters; or,
maintaining, by the base station, a plurality of counters; performing, by the base station, the LBT operation in a direction corresponding to one beam until the operation is performed beyond the preset time period; and if the LBT is not successful, switching, by the base station, to other counter of the plurality of counters other than one counter, corresponding to the one beam, of the plurality of counters, performing, by the base station, the LBT operation in a direction corresponding to other beam, retaining, by the base station, values of the plurality of counters, and resetting, by the base station, values of the plurality of counters after a number of times of the performing for the LBT operation beyond the preset time period is greater than a preset value; or,
maintaining, by the base station, a plurality of counters; and performing, by the base station, the LBT operation in a direction corresponding to each of beams by means of sequential time division of scanning for the beams;
wherein time granularity of scanning is configurable;
wherein the time granularity of scanning is an integral multiple of a clear channel assessment (CCA) slot or an integral multiple of an orthogonal frequency division multiplex (OFDM) symbol.

6. The method according to claim 1, wherein the channel occupation request signal comprises one of the following information or a combination of the following information:
information of a scheduled user equipment identity (UEID), a beam ID of the beam sending the channel occupation request signal, position information, in the space, of the beam sending the channel occupation request signal, channel occupation time information of the beam sending the channel occupation request signal, a resource configuration required in the condition that the terminal feeds back the signal indicating that the channel is allowed to be occupied, LBT type information required in the condition that the terminal feeds back the signal indicating that the channel is allowed to be occupied, or pilot frequency information used for measuring channel quality.

7. The method according to claim 1, wherein:
the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network; or,
the signal indicating that the channel is allowed to be occupied is fed back by means of time information configured for the terminal by the base station; or,
the signal indicating that the channel is allowed to be occupied is fed back by each terminal at the same time.

8. The method according to claim 7, in the condition that the signal indicating that the channel is allowed to be occupied is fed back by means of time information configured for the terminal by the base station; or, the signal indicating that the channel is allowed to be occupied is fed back by each terminal at the same time, the method further comprises:
configuring, by the base station, for the terminal an LBT parameter required to be used to feed back the signal indicating that the channel is allowed to be occupied.

9. The method according to claim 8, wherein the LBT parameter comprises a size of a counter or size information of a contention window used for producing the counter, in the condition that an LBT type in the LBT parameter is LBT cat.4.

10. The method according to claim 1, further comprising:
transmitting, by the base station, the data on a beam with most multiplexing users or a beam with largest transmission capacity, in the condition that the base station receives, on a plurality of beams, the signal indicating that the channel is allowed to be occupied.

11. The method according to claim 1, further comprising:
scheduling, by the base station, a user having a successful handshake between the channel occupation request signal and the signal indicating that the channel is allowed to be occupied to transmit data, in the condition that the base station receives, on a plurality of beams, the signal indicating that the channel is allowed to be occupied; and/or,
transmitting, by the base station, the data on a beam on which a ratio of the number of users sending the signal indicating that the channel is allowed to be occupied to the number of users receiving the channel occupation request signal is greater than a preset value, in the condition that the base station receives, on a plurality of beams, the signal indicating that the channel is allowed to be occupied.

12. The method according to claim 11, wherein the data is transmitted on an LBT time-superior beam which is selected from the beams on which the ratio of the number of users sending the signal indicating that the channel is allowed to be occupied to the number of users receiving the channel occupation request signal is greater than the preset value.

13. The method according to claim 1, further comprising:
waiting, by the base station, on the beam, to receive the signal indicating that the channel is allowed to be occupied, after the base station sends the channel occupation request signal to the terminal on the beam; and/or,
sending, by the base station, on a next beam, to the terminal a channel occupation request signal, and receives, on the beam sending the channel occupation request signal, a corresponding signal indicating that a channel is allowed to be occupied, after the base station sends the channel occupation request signal to the terminal on the beam.

14. A signal feedback method, comprising:
receiving, by a terminal, a channel occupation request signal sent by a base station on at least one beam after the base station performs a listen before talk (LBT) operation in a direction corresponding to at least one beam, wherein the channel occupation request signal is a signal for requesting channel occupation; and
feeding back, by the terminal, a signal indicating that a channel is allowed to be occupied on a beam on which the channel occupation request signal is received to the base station, after the terminal receives the channel occupation request signal correctly;
wherein LBT cat.1 is used to perform the LBT operation, in the condition that a beam correspondence is not be guaranteed.

15. The method according to claim 14, wherein the signal indicating that the channel is allowed to be occupied comprises one of the following information or a combination of the following information:
information related to channel occupation time, ID information of the beam, user equipment identity (UEID) information of the terminal, beam-based channel quality indicator (CQI) information.

16. The method according to claim 14, wherein:
the signal indicating that the channel is allowed to be occupied is fed back by means of interlace information dynamically indicated by the base station; and/or, the signal indicating that the channel is allowed to be occupied is fed back by means of interlace information semi-statically configured for the terminal by a network; or
the signal indicating that the channel is allowed to be occupied is fed back by means of time information configured for the terminal by the base station.

17. The method according to claim 16, in the condition that the signal indicating that the channel is allowed to be occupied is fed back by means of time information configured for the terminal by the base station, the method further comprises:
receiving, by the terminal, a listen before talk (LBT) parameter which is configured for the terminal by the base station and required to be used to feed back the signal indicating that the channel is allowed to be occupied; and
feeding back, by the terminal, the signal indicating that the channel is allowed to be occupied to the base station, after an LBT operation is performed in a direction, corresponding to the beam on which the signal is received, according to the LBT parameter;
wherein the LBT operation is performed according to a size, comprised in the LBT parameter, of a counter or size information, comprised in the LBT parameter, of a contention window used for producing the counter, in the condition that an LBT type in the LBT parameter is LBT cat.4.

18. A base station, comprising:
a processor, configured to read a program in a memory and process data according to a requirement of a transceiver; and
the transceiver, configured to receive and transmit data under the control of the processor, and configured to perform the method according to claim 1.

19. A terminal, comprising:
a processor, configured to read a program in a memory and process data according to a requirement of a transceiver;
the transceiver, configured to receive and transmit data under the control of the processor, and configured to perform the method according to claim 14.

20. A data transmission method, comprising:
sending, by a base station, a channel occupation request signal to request channel occupation to a terminal, after the base station performs a listen before talk (LBT) operation in a direction corresponding to at least one beam; and
transmitting, by the base station, data on a beam sending the channel occupation request signal, after the base station receives a signal indicating that a channel is allowed to be occupied;
wherein the method further comprises:
transmitting, by the base station, the data on a beam with most multiplexing users or a beam with largest transmission capacity, in the condition that the base station receives, on a plurality of beams, the signal indicating that the channel is allowed to be occupied;
or wherein the method further comprises:
scheduling, by the base station, a user having a successful handshake between the channel occupation request signal and the signal indicating that the channel is allowed to be occupied to transmit data, in the condition that the base station receives, on a plurality of beams, the signal indicating that the channel is allowed to be occupied; and/or, transmitting, by the base station, the data on a beam on which a ratio of the number of users sending the signal indicating that the channel is allowed to be occupied to the number of users receiving the channel occupation request signal is greater than a preset value, in the condition that the base station receives, on a plurality of beams, the signal indicating that the channel is allowed to be occupied.

* * * * *